United States Patent
Saul

(10) Patent No.: US 8,668,967 B2
(45) Date of Patent: Mar. 11, 2014

(54) EMBELLISHMENT TRANSFER DELIVERY SYSTEM

(75) Inventor: Robert Michael Saul, Morrow, OH (US)

(73) Assignee: Zoom Creative Products, LLC, Morrow, OH (US)

( * ) Notice: Subject to any disclaimer, the term of this patent is extended or adjusted under 35 U.S.C. 154(b) by 129 days.

(21) Appl. No.: 13/048,263

(22) Filed: Mar. 15, 2011

(65) Prior Publication Data

US 2012/0234477 A1 Sep. 20, 2012

(51) Int. Cl.
| | |
|---|---|
| *B41M 5/00* | (2006.01) |
| *B44C 1/10* | (2006.01) |
| *B44C 5/02* | (2006.01) |
| *B41M 5/42* | (2006.01) |
| *B41M 5/382* | (2006.01) |
| *B41M 5/392* | (2006.01) |
| *B41M 3/12* | (2006.01) |

(52) U.S. Cl.
CPC . *B44C 1/105* (2013.01); *B44C 5/02* (2013.01); *B41M 5/42* (2013.01); *B41M 5/38214* (2013.01); *B41M 5/392* (2013.01); *B41M 3/12* (2013.01); *Y10S 428/9133* (2013.01); *Y10S 428/914* (2013.01)
USPC ................. 428/32.69; 428/32.74; 428/32.77; 428/32.78; 428/913.3; 428/914

(58) Field of Classification Search
CPC ............ B44C 5/02; B44C 1/105; B41M 5/42; B41M 5/38214; B41M 5/392; B41M 3/12
USPC .......... 428/32.69, 32.74, 32.77, 32.78, 913.3, 428/914
See application file for complete search history.

(56) References Cited

U.S. PATENT DOCUMENTS

| | | | |
|---|---|---|---|
| 4,292,100 A | 9/1981 | Higashiguchi | |
| 4,514,457 A | 4/1985 | Sasaki | |
| 4,770,732 A | 9/1988 | Steelman | |
| 4,980,216 A | 12/1990 | Rompp | |
| 5,008,139 A | 4/1991 | Ochi et al. | |
| 5,275,871 A | 1/1994 | Hambright | |
| 5,294,657 A * | 3/1994 | Melendy et al. | 524/270 |
| 5,489,355 A | 2/1996 | Shimizu et al. | |
| 5,858,150 A * | 1/1999 | Yarusso et al. | 156/163 |
| 5,869,168 A * | 2/1999 | Mahn, Jr. | 428/32.77 |
| 6,808,792 B1 | 10/2004 | Weber | |
| 7,807,246 B2 | 10/2010 | Truog et al. | |
| 2002/0114912 A1* | 8/2002 | House | 428/42.3 |
| 2003/0072889 A1* | 4/2003 | Abrams | 427/458 |
| 2007/0009681 A1 | 1/2007 | Weder | |

* cited by examiner

*Primary Examiner* — Betelhem Shewareged
(74) *Attorney, Agent, or Firm* — The Van Winkle Law Firm; R. Brian Johnson

(57) ABSTRACT

An embellishment transfer delivery system (ETDS) uses an embellishment, such as glitter, and combines it into a transfer adhesive that is combined with a carrier sheet and finally transferred to a sticky substrate, such as a double sided tape. The result is the clean, particle-free, non-tacky, dry transfer of the embellishment to cover an object with precise, complete and detailed coverage. The ETDS is a clean and fully transferrable system of holding, containing and transferring glitter or other embellishments to a double sided tape that allows for detailed coverage and no residual mess or airborne particles. The embellishment is suspended in an adhesive which is then coated onto a pressure sensitive carrier sheet to create the ETDS. The embellishment transfers from the ETDS and bonds to the application in a way that allows for a clean, detailed finished product without any of the mess, stickiness or wait time traditional delivery systems would entail.

6 Claims, 3 Drawing Sheets

EMBELLISHMENT TRANSFER DELIVERY SYSTEM

BACKGROUND OF THE INVENTION

The present invention generally relates to arts, crafts and decorating, and more particularly, to an embellishment transfer delivery system that delivers an embellishment, such as glitter, while minimizing possible mess.

Embellishments, such as glitter, are extremely messy. Embellishments are very hard to contain because the particles are extremely small and light. Embellishments are typically dispensed from containers that require you to shake, sprinkle, spoon or spread them onto your application. Embellishments are reused by attempting to gather up those minute particles, thus creating an even larger mess. Embellishments, such as glitter, are a nuisance. Particles can become airborne and adhere to any substance they contact.

Embellishments, such as glitter and glue, when typically combined, create a runny, gummy mess. That mess is not contained to the specific application or project for which the glitter is intended to embellish. There is no way to be precise or accurate with an embellishment and glue mixture. This mess transfers to hands, work surfaces and floors. Embellishments, especially like glitter, with and without glue, embeds itself into fabrics and static clings to skin and other surfaces in the home or work environment.

As can be seen, there is a need for an embellishment transfer delivery system that combines an embellishment and an adhesive in a manner that is dry on contact and remains dry once applied, thereby being mess-free.

SUMMARY OF THE INVENTION

In one aspect of the present invention, an embellishment transfer delivery system comprises a locked embellishment layer; a deadening agent layer attached to a first side of the locked embellishment layer; and a carrier sheet attached to a second side of the locked embellishment layer.

In another aspect of the present invention, a method for transferring an embellishment onto a substrate comprises applying the embellishment to an adhesive to form a locked embellishment layer; sandwiching the locked embellishment layer between a carrier sheet and a deadening agent layer; and applying the deadening agent layer to a sticky surface of the substrate to transfer the locked embellishment layer from the carrier sheet onto the substrate.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides an embellishment transfer delivery system (ETDS) that uses an embellishment, such as glitter, and combines it into a transfer adhesive that is combined with a carrier sheet and finally transferred to a sticky substrate, such as a double sided tape. The result is the clean, particle-free, non-tacky, dry transfer of the embellishment to cover an object with precise, complete and detailed coverage. The ETDS is a clean and fully transferrable system of holding, containing and transferring glitter or other embellishments to a double sided tape that allows for detailed coverage and no residual mess or airborne particles. The embellishment is suspended in an adhesive which is then coated onto a pressure sensitive carrier sheet to create the ETDS. The embellishment transfers from the ETDS and bonds to the application in a way that allows for a clean, detailed finished product without any of the mess, stickiness or wait time traditional delivery systems would entail.

Figure 1:
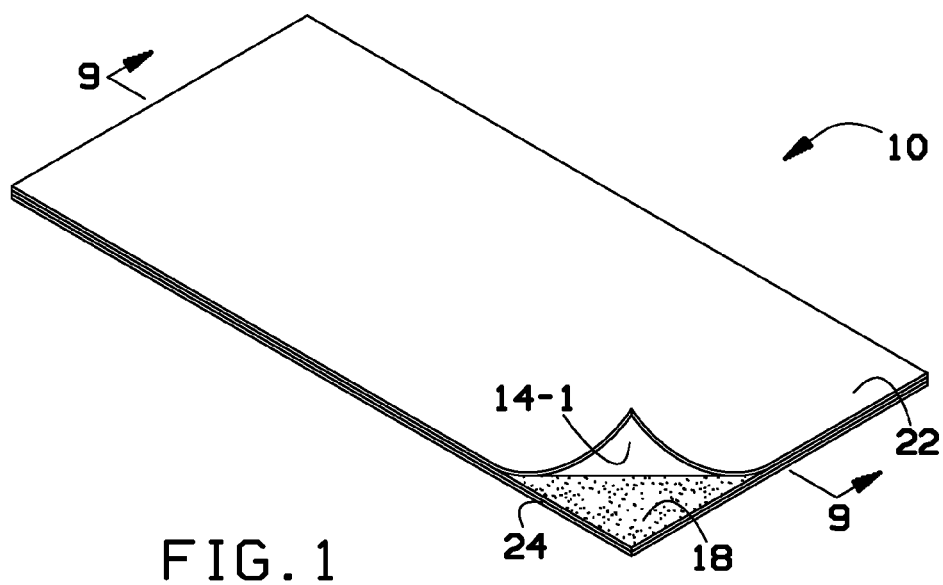
FIG. 1 is a perspective of an embellishment transfer delivery system (ETDS) according to an exemplary embodiment of the present invention.

Referring to FIG. 1, an ETDS 10 may include a locked embellishment layer 18 covered with a deadening agent 24 on a first side of the locked embellishment layer 18. The second side of the locked embellishment layer 18 may be covered with a face material 22. The face material 22 may be attached to the locked embellishment layer 18 with an adhesive 14-1.

Figure 2:
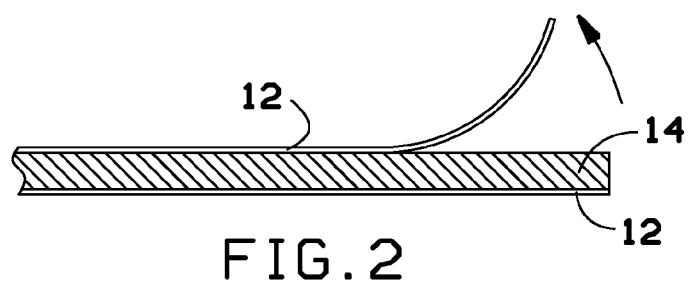
FIGS. 2 through 11 are cross-sectional views showing steps for the preparation of the ETDS of FIG. 1.
Figure 3:
Figure 4:
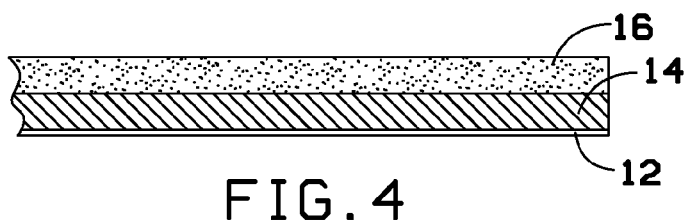

Referring now to FIGS. 2 through 11, the steps for preparing the ETDS 10 are shown. A transfer/locking adhesive 14 may be disposed between liner sheets 12. One of the liner sheets 12 may be removed, as shown in FIGS. 2 and 3, and an embellishment may be applied to the adhesive 14 as shown in FIG. 4. The embellishment may be any typical embellishment, such as glitter, sand, flock, flakes, confetti, paper and foil, including embellishments made from vinyl, metallic, polyester or other material. The embellishment may have various shapes, including hexagon, spherical or other shapes. The average size of the embellishment particles may be from about 0.001 inch to about 0.025 inch, for example, 0.001 inch, 0.004 inch, 0.008 inch and 0.015 inch. The liner sheets 12 may be, for example, made of a silicone coated liner sheet material such that the adhesive 14 is free-floating between the liner sheets 12 and the liner sheets 12 may be separated from the adhesive 14.

Figure 5:
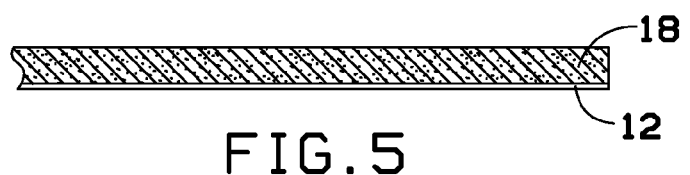
Figure 6:
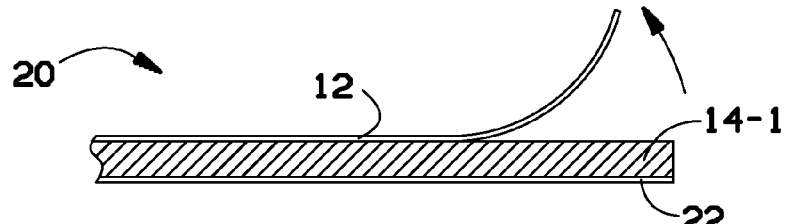
Figure 7:

As shown in FIG. 5, pressure may be applied to the embellishment 16 to produce the locked embellishment layer 18 from combining the embellishment 16 with the adhesive 14.

Figure 8:
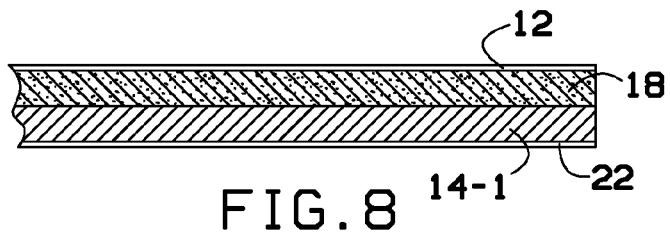

An adhesive coated carrier sheet 20 may include an adhesive 14-1 sandwiched between the face material 22 and another liner sheet 12. The liner sheet 12 may be removed to expose the adhesive 14-1 and the locked embellishment layer 18 may be secured to the adhesive 14-1 as shown in FIG. 8. The face material 22 may be, for example, paper, vinyl, bi-axially oriented polypropylene film (BOPP), polyethylene film, or the like. The face material 22 may be clear, frosty, opaque or solid white.

Figure 9:
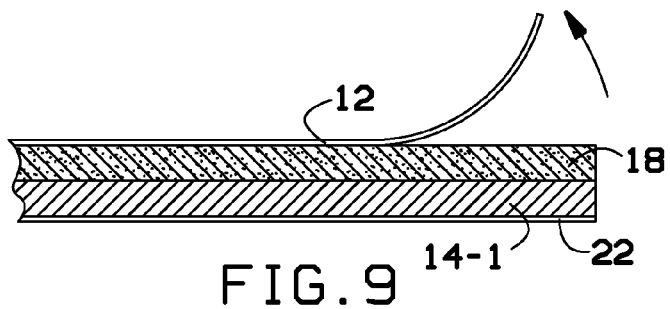
Figure 10:
Figure 11:
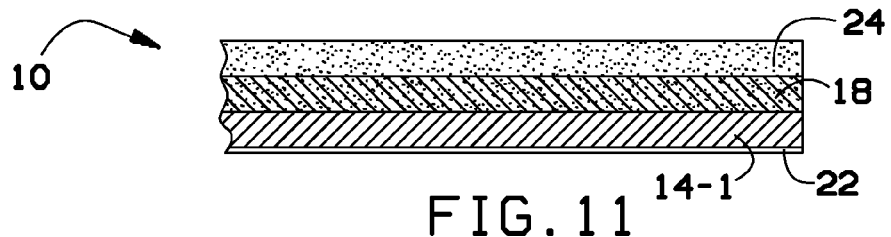

The liner sheet 12 may then be removed from the locked embellishment layer 18 and a deadening agent 24 may be applied thereto, as shown in FIGS. 9 through 11. The deadening agent 24 may be, for example, foil, talc, chalk, cornstarch or the like. Once the deadening agent is applied, the creation of the ETDS 10 is complete.

Figure 12:
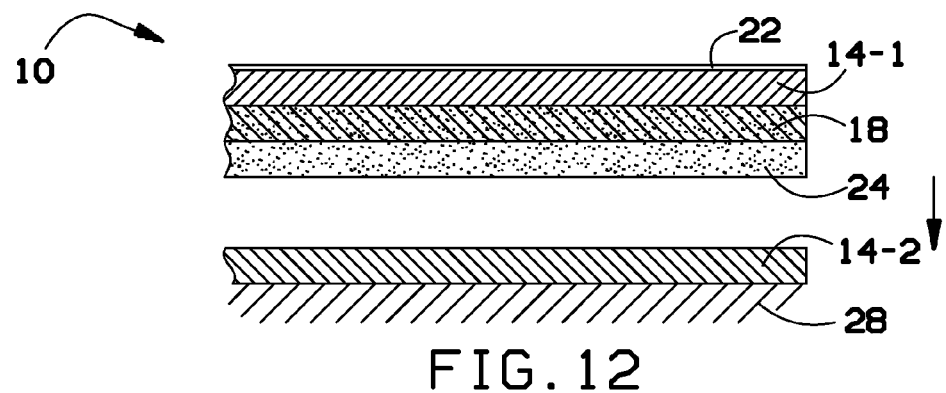
FIGS. 12 and 13 are cross-sectional views showing steps for the application of an embellishment according to an exemplary embodiment of the present invention.
Figure 13:
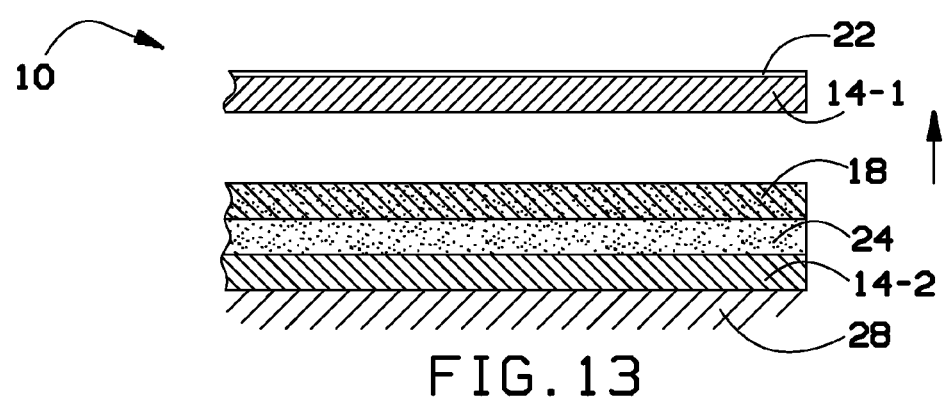
Figure 14:
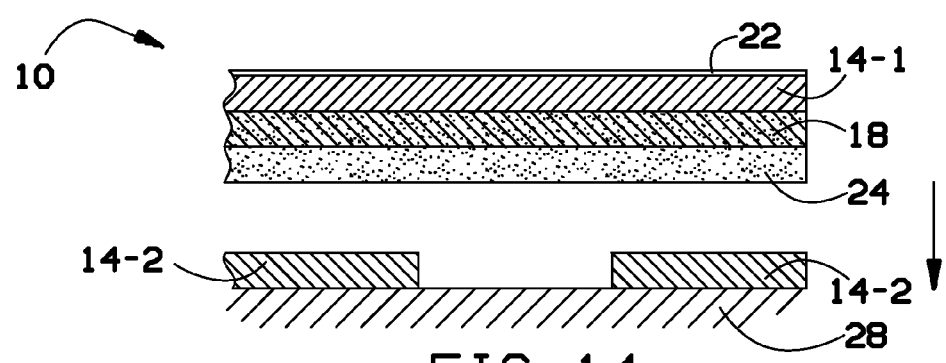
FIGS. 14 and 15 are cross-sectional views showing steps for the application of the embellishment according to another exemplary embodiment of the present invention.
Figure 15:
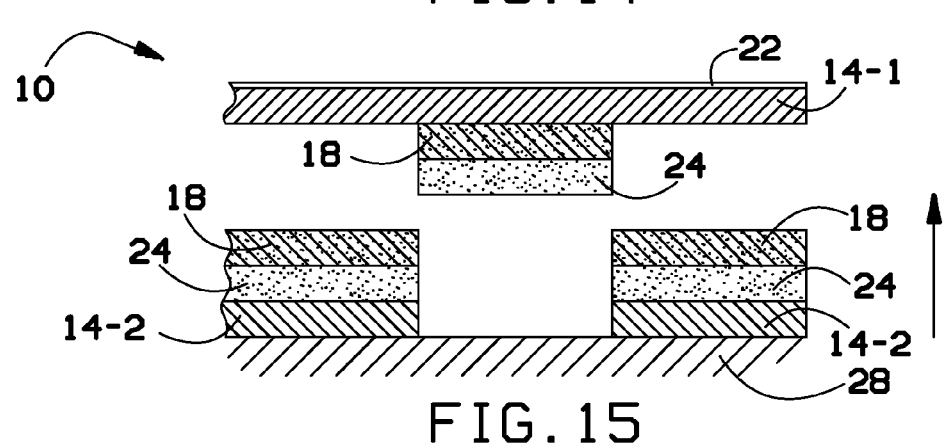

Referring now to FIGS. 12 and 13, to use the ETDS 10, the user may simply touch the ETDS 10 (the deadening agent 24 surface thereof) to a sticky substance 14-2 attached to a substrate 28. The embellishment may be cleanly, accurately and neatly removed from the carrier completely covering the sticky substance 14-2 with no residual glitter dust or mess. As shown in FIGS. 14 and 15, only the area of the deadening agent 24 that comes in contact with the sticky substance 14-2 removes or transfers off the ETDS 10. No other surrounding areas have embellishment transferred to them. The ETDS 10 can be used repeatedly until all of the embellishment is transferred off the sheet. Once the embellishment is transferred to the sticky substance 14-2, it is bonded to that area and will not come off by touching or lightly rubbing the area. The embellishment that transfers may be completely locked to the sticky substance 14-2 and may not rub off on hands, clothing or other substances. The sticky substance 14-2 may be, for example, tape (such as double sided tape), glue, sticky foam, sprays or other sticky products. The sticky substance 14-2 may be cut into shapes, applied to the substrate 28, and the ETDS 10 may be used to apply an embellishment in the shape of the sticky substance 14-2.

It should be understood, of course, that the foregoing relates to exemplary embodiments of the invention and that modifications may be made without departing from the spirit and scope of the invention as set forth in the following claims.

What is claimed is:

1. An embellishment transfer delivery system comprising:
   a locked embellishment layer comprising an embellishment suspended entirely within an embellishment locking adhesive;
   a deadening agent layer attached to a first side of said locked embellishment layer; and
   a carrier sheet attached to a second side of the locked embellishment layer by an adhesive layer other than said locked embellishment layer.

2. The embellishment transfer delivery system of claim 1, wherein the deadening agent layer is formed from at least one of a foil, talc, cornstarch or chalk.

3. The embellishment transfer delivery system of claim 1, wherein the embellishment is selected from the group consisting of glitter, sand, flock, flakes, confetti, paper and foil.

4. The embellishment transfer delivery system of claim 1, wherein the embellishment is polyester glitter.

5. The embellishment transfer delivery system of claim 1, wherein the carrier sheet is a bi-axially oriented polypropylene film (BOPP).

6. The embellishment transfer delivery system of claim 1, wherein the deadening agent layer is a foil.

* * * * *